United States Patent [19]
Sejalon et al.

[11] Patent Number: 5,991,234
[45] Date of Patent: Nov. 23, 1999

[54] ULTRASONIC SENSOR SYSTEM AND METHOD HAVING AUTOMATIC EXCITATION FREQUENCY ADJUSTMENT

[75] Inventors: Frederic Marcel Sejalon, Commerce Township; Stephen R. W. Cooper, Fowlerville; Michelle Renee Schaffran, Novi, all of Mich.

[73] Assignee: TRW Inc., Lyndhurst, Ohio

[21] Appl. No.: 09/097,091

[22] Filed: Jun. 11, 1998

[51] Int. Cl.⁶ .................................................. H04B 17/00
[52] U.S. Cl. ................................................................ 367/13
[58] Field of Search .................................... 367/13, 97, 99, 367/902; 73/597; 280/735; 310/315

[56] References Cited

U.S. PATENT DOCUMENTS

| | | |
|---|---|---|
| 3,745,520 | 7/1973 | Barret et al. . |
| 3,967,143 | 6/1976 | Watanabe et al. ....................... 310/315 |
| 3,985,030 | 10/1976 | Charlton . |
| 4,000,650 | 1/1977 | Snyder . |
| 4,114,441 | 9/1978 | Magri . |
| 4,166,394 | 9/1979 | Figura . |
| 4,169,255 | 9/1979 | Hulsman et al. . |
| 4,221,004 | 9/1980 | Combs et al. . |
| 4,299,114 | 11/1981 | Silvermetz et al. . |
| 4,320,659 | 3/1982 | Lynnworth et al. . |
| 4,567,766 | 2/1986 | Seiferling . |
| 4,687,962 | 8/1987 | Elbert . |
| 4,785,664 | 11/1988 | Reebs . |
| 4,793,178 | 12/1988 | Ahern et al. . |
| 4,869,097 | 9/1989 | Tittman et al. . |
| 4,890,266 | 12/1989 | Woodward . |
| 4,901,245 | 2/1990 | Olson et al. . |
| 4,914,951 | 4/1990 | Koelpin et al. . |
| 5,156,636 | 10/1992 | Kuljis . |
| 5,157,639 | 10/1992 | Leszczynski . |
| 5,207,101 | 5/1993 | Haynes . |
| 5,212,467 | 5/1993 | Park . |
| 5,277,065 | 1/1994 | Leszczynski ............................ 367/903 |
| 5,330,226 | 7/1994 | Gentry et al. . |
| 5,351,527 | 10/1994 | Blackburn et al. . |
| 5,413,378 | 5/1995 | Steffens, Jr. et al. . |
| 5,454,591 | 10/1995 | Mazur et al. ........................... 280/735 |
| 5,670,853 | 9/1997 | Bauer . |

*Primary Examiner*—Daniel T. Pihulic
*Attorney, Agent, or Firm*—Tarolli, Sundheim, Covell, Tummino & Szabo

[57] ABSTRACT

An ultrasonic sensor system (40) has a transducer (44) that emits an ultrasonic signal (52), in response to an electrical excitation signal (50) from driver/receiver circuitry (46), and outputs an electrical response signal (56), in response to receipt of a reflected ultrasonic signal (54) from an occupant (54). The transducer (44) rings-down upon termination of the excitation signal (50). The transducer (44) has a natural resonant frequency that is subject to change. In an occupant sense mode, a receiver portion (68) of the driver/receiver circuitry (46) and a controller (30) process the response signal (56), resulting from transducer excitation at a predetermined frequency, to determining distance between the transducer (44) and the occupant (14). In an adjust mode, the controller (30) varies the frequency of the excitation signal (50) over a range of frequencies, and monitors the ringdown of the transducer (44) during the variation of the frequency to determine a current natural resonant frequency of the transducer (44). The controller (30) changes the predetermined frequency to the determined natural resonant frequency, so that subsequent operation in the sense mode utilizes the resonant frequency.

22 Claims, 6 Drawing Sheets

ULTRASONIC SENSOR SYSTEM AND METHOD HAVING AUTOMATIC EXCITATION FREQUENCY ADJUSTMENT

FIELD OF THE INVENTION

The present invention is directed to ultrasonic sensing and is particularly directed to a sensor system and method in which the operating frequency is automatically adjusted.

BACKGROUND OF THE INVENTION

Ultrasonic sensors are used to make remote distance measurements. One particular use of ultrasonic sensors is within a vehicle occupant restraint system within a vehicle.

One particular type of restraint system includes an actuatable restraint device. Examples of actuatable devices include inflatable air bags and seat belt system pretensioners. The actuatable devices are actuated in response to one or more conditions for which it is predetermined that the occupant is to be restrained. For example, the restraint system includes a crash sensor that senses a vehicle collision. A controller of the restraint system causes actuation of the restraint device in response to a signal indicative of a vehicle collision from the crash sensor.

It is known in the art to adjust or tailor the actuation or deployment of a restraint device. For example, the art has recognized that it is not always desirable to inflate an air bag with 100 percent of the available gas provided from a source of inflation fluid. It is known to adjust or tailor the restraint deployment based upon one or more sensed occupant characteristics. An occupant restraint device that has an adjustable aspect that is adjusted in response to a determination based upon a sensed occupant characteristic is commonly referred to as a "smart restraint." It is known to use one or more ultrasonic sensors to sense one or more occupant characteristics (e.g., occupant position) for use in determining adjustment of a restraint device.

Ultrasonic sensors typically have a piezoelectric ceramic transducer that converts an excitation electrical signal into ultrasonic energy bursts. The energy bursts travel from the ultrasonic sensor, bounce off objects, and are returned toward the sensor as echoes. The transducer converts the echoes into electrical signals.

The efficiency of an ultrasonic transducer varies with the frequency at which the transducer is excited. It is known that ultrasonic sensors perform optimally at their natural resonant frequency. The natural resonant frequency is also referred to as the "ringdown" frequency, because once excitation of the transducer ceases, the transducer has a decaying ringdown that occurs at the natural resonant frequency of the transducer.

The natural resonant frequency (or natural frequency) of an ultrasonic sensor transducer changes or "drifts" in response to temperature change. In order to maintain an ultrasonic sensor operating at peak efficiency, it is known to adjust the operating or excitation frequency to track the changes in the natural frequency. One known method of tracking the "drifting" natural frequency includes using a temperature sensor co-located with the transducer and a calibration table stored in memory. As temperature change is sensed, the calibration table is accessed to select an updated excitation frequency.

However, such an approach requires the collection and processing of temperature information. Also, the manner and amount of temperature-induced frequency drift varies from sensor unit to sensor unit. Thus, separate calibration tables may be required for each sensor unit. Further, the natural frequency may change for other reasons, such as component aging.

SUMMARY OF THE INVENTION

The present invention provides an ultrasonic sensor system. Transducer means emits an ultrasonic signal in response to an electrical excitation signal and outputs an electrical response signal in response to receipt of a reflected ultrasonic signal from an object. The transducer means rings-down upon termination of the electrical excitation signal. The transducer means has a natural resonant frequency that is subject to change. Excitation signal provision means provides the electrical excitation signal to the transducer means. Processing means processes the electrical response signal resulting from excitation of the transducer means by the electrical excitation signal at a predetermined frequency for determining distance between the transducer and the object. Sweep means varies the frequency of the excitation signal over a range of frequencies. Monitor means monitors the ringdown of the transducer means during the variation of the frequency of the electrical excitation signal over the range of frequencies and determines a current natural resonant frequency of the transducer means. Adjustment means changes the predetermined frequency to the determined natural resonant frequency.

The present invention also provides a method of ultrasonic sensing with automatic excitation frequency adjustment. An electrical excitation signal is provided to a transducer means. An ultrasonic signal is emitted from the transducer means in response to the electrical excitation signal. The transducer means rings-down upon termination of the electrical excitation signal. The transducer means has a natural resonant frequency that is subject to change. An electrical response signal is output in response to receipt of a reflected ultrasonic signal from an object. The electrical response signal resulting from excitation of the transducer means by the electrical excitation signal at a predetermined frequency is processed to determine distance between the transducer means and the object. The frequency of the electrical excitation signal is varied over a range of frequencies. The ringdown of the transducer means is monitored during the variation of the frequency of the excitation signal over the range of frequencies. A current natural resonant frequency of the transducer means is determined. The predetermined frequency is changed to the determined natural resonant frequency.

DESCRIPTION OF DRAWINGS

The foregoing and other features and advantages of the present invention will becomes apparent to one skilled in the art to which the present invention relates upon consideration of the following description of the invention with reference to the accompanying drawings, wherein.

DESCRIPTION OF PREFERRED EMBODIMENTS

Figure 1:
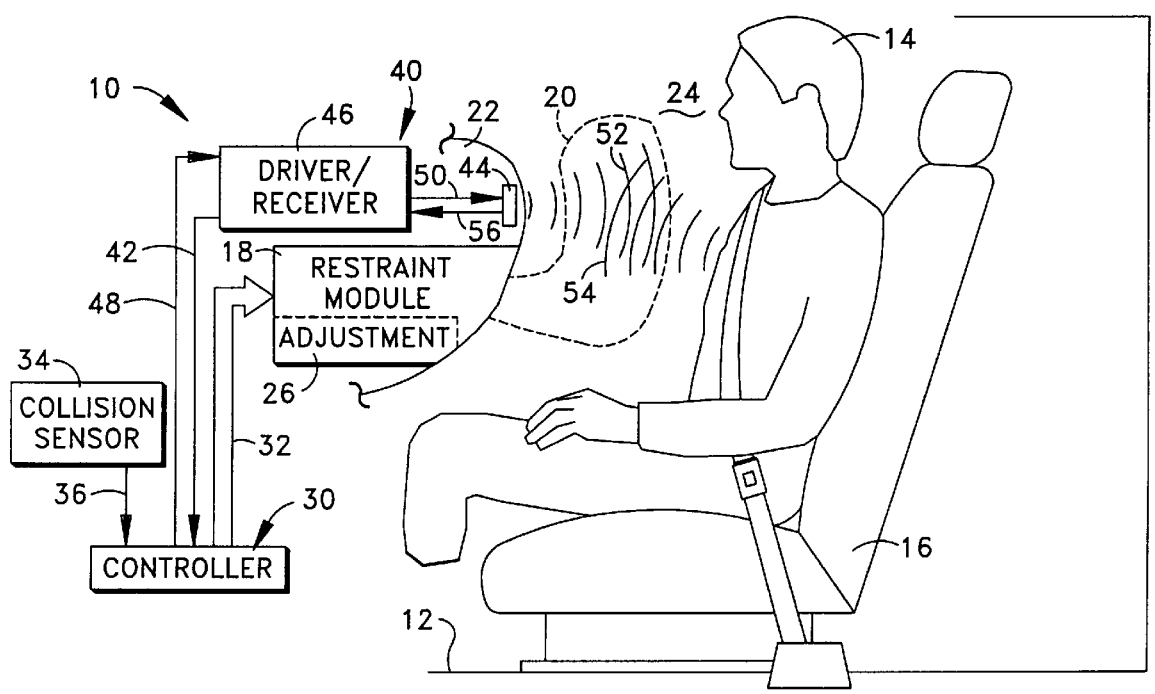
FIG. 1 is a schematic illustration of a vehicle occupant restraint system having an ultrasonic sensor system in accordance with the present invention.

An occupant restraint system 10 is schematically shown within a vehicle 12 in FIG. 1. The restraint system 10 is provided for a vehicle occupant 14, who is a front-seat passenger and who is seated on a vehicle seat 16 within the vehicle 12. Within the system 10 is an actuatable occupant restraint module 18, which includes an inflatable restraint 20. The inflatable restraint 20 is commonly referred to as an air bag.

Prior to inflation deployment, the air bag 20 is folded and stored within an instrument panel 22 of the vehicle, as is known in the art. A source of inflation fluid (not illustrated), such as an inert gas, is operatively connected to the air bag 20. Inflation fluid from the source, which may be genera ted by combustion of pyrotechnic material and/or released from a pressurized container, fills the air bag 20 to an inflated condition within an occupant compartment 24 of the vehicle 12. Once inflated, as occurs during a vehicle collision, the air bag 20 hopefully restrains the occupant 14.

The restraint module 18 is of the type referred to in the art as a "smart restraint", in that the restraint module has at least one associated adjustable aspect 26. For example, one adjustable aspect 26 may be directed to deployment of the air bag 20. Examples of air bag deployment adjustment include deployment prevention, adjustment of inflation timing, adjustment of inflation pressure, and adjustment of location of the inflated air bag 20 relative to the occupant 14. A specific example of adjustment to inflation timing is control of the time of initiation of air bag inflation using a selected determination algorithm.

A specific example of adjustment of inflation pressure is control of an inflation fluid source to provide a controlled or pre-selected amount of inflation fluid to the air bag 20, e.g., a restraint system having a plurality of separately controllable inflation fluid sources. Another specific example of adjustment of inflation pressure is control of a pressure release valve, which vents inflation fluid away from the air bag 20. A specific example of adjustment of air bag positioning is control of positioning motors operative to pivot the restraint module 18 left, right, up, or down within the instrument panel 22. Another specific example of adjustment of air bag positioning is moving the entire restraint module 18 toward or away from the occupant 14. Also, dynamic profile control can be accomplished by controllably directing inflation into the air bag 20 in predetermined zones within the air bag or by controlling the number and timing of operation of a plurality of inflation fluid sources and vent valves.

Control of the restraint module 18, to adjust the adjustable aspect(s) 26 and to cause actuation of the restraint module, is accomplished by a controller 30. The controller 30 provides control signals 32 to the restraint module 18. In one example, the controller 30 is a microcomputer. The controller 30 receives sensory input from several sources and, using the sensory input, makes determinations regarding restraint module control (e.g., the controller performs a crash algorithm).

One of the sensory input sources for the controller 30 is a sensor 34 that senses a vehicle condition for which the occupant 14 is to be restrained. The sensor 34 provides a signal 36 to the controller 30 indicative of the sensed vehicle condition. In one example, which is illustrated in the figures, the sensor 34 is a collision/crash sensor and senses a condition that is indicative of a vehicle collision. Preferably, the collision sensor 34 is an accelerometer, and the signal 36 is an electrical signal having a characteristic (e.g., voltage, frequency) indicative of the sensed crash acceleration. It will be appreciated by a person of ordinary skill in the art that the restraint system 10 could have a plurality of sensors 34 providing signals 36 to the controller 30 that are indicative of a variety of vehicle conditions for which the occupant 14 is to be restrained.

The controller 30 analyzes the signal 36 from the sensor 34 and determines if a deployment crash condition is occurring. A deployment crash condition is one in which deployment of the air bag is desired to enhance the restraining function of the restraint system for the occupant 14. It is contemplated that any of several known crash algorithms can be used for the determination of a deployment crash event. Examples of such algorithms are known in the art and they are not discussed herein for brevity.

Another sensory input source for the controller 30 is an ultrasonic sensor system 40, in accordance with the present invention, which provides an output signal 42 for use by the controller 30. The sensor system 40 includes an ultrasonic transducer 44, an associated driver/receiver circuitry 46, and part of the controller 30.

The controller 30 provides a control signal 48 to the driver/receiver circuitry 46. In response to the control signal 48, the driver/receiver circuitry 46 provides an oscillating electrical excitation signal 50 to the ultrasonic transducer 44. The transducer 44 includes a piezoelectric element, which is excited in response to the electrical excitation to cause a mechanical movement.

The mechanical movement within the transducer 44 is a vibration (i.e., oscillation), such that the transducer emits an ultrasonic pulse signal 52. During the electrical excitation of the transducer 44, the frequency of the mechanical vibration within the transducer is related to the frequency of the excitation signal 50. In other words, the excitation signal 50 drives the mechanical vibration.

The amplitude of the mechanical vibration is dependent upon the amplitude of the excitation signal 50, and upon the frequency of the excitation signal. Specifically, the transducer has a natural resonant frequency, which is due to the unique physical constraints of the transducer 44. For a given excitation signal amplitude, maximum mechanical vibration amplitude within the transducer 44 is achieved when the excitation signal is at the natural resonant frequency of the transducer.

Once the excitation signal 50 is terminated, the mechanical vibration of the transducer 44 decays, exponentially, down toward zero. This decaying vibration is referred to as "ringdown." The duration of the ringdown is related to the amplitude of the vibration at the beginning of the ringdown.

Vibration within the transducer 44 is also caused by an ultrasonic signal 54 impinging upon the transducer. The impinging ultrasonic signal 54 is typically a reflected pulse returning to the transducer 44. The reflected pulse is often referred to as an echo. In response to the impinging (i.e., echo or reflected) signal 54, the transducer 44 provides an oscillating electrical signal 56 to its driver/receiver circuitry 46.

The difference in time between the emission of the signal 52 from the transducer 44 and the receipt of the echo signal 54 by the transducer is indicative of the distance between the transducer and an object that reflects the ultrasonic signal. In response to the signal 56, the driver/receiver circuitry 46 outputs the signal 42 to the controller 30. Thus, the signal 42 is indicative of the receipt of the echo signal 54 impinging upon the transducer 44. The controller 30 determines (e.g., measures) the time between providing the signal 48 to the driver/receiver circuitry 46 (which causes the transmission of the signal 52) and receipt of the signal 42 (which is indicative of the receipt of the echo signal 54 at the transducer 44). From this time differential, the controller 30 calculates a distance between the transducer 44 and the object that reflected the signal.

In the illustrated example, the transducer 44 is shown as being located within the instrument panel 22. A person of ordinary skill in the art will appreciate that the transducer 44 may be located at other locations within the vehicle 12 for making appropriate distance measurements with regard to such other location.

During operation of the illustrated embodiment, the transducer 44 directs its ultrasonic signal 52 from the instrument panel 22 toward the occupant position (i.e., the space within the occupant compartment 24 in front of the seat 16) in response to the electrical excitation. If the occupant 14 is seated on the seat 16, the ultrasonic signal 52 impinges upon the occupant. The echo signal 54 is returned to the transducer 44, and the transducer provides the electrical signal 56 to the driver/receiver circuitry 46. The driver/receiver circuitry 46 outputs the signal 42 to the controller 30, and the controller performs the time difference determination. In turn, the distance between the transducer 44 and the occupant 14 is calculated.

The echo signal 54 that is reflected by the occupant 14, as opposed to a reflection from the seat 16, is indicative of the presence of the occupant. The controller 30 uses the occupant presence-indicative information to make one or more determinations regarding the deployment and/or adjustment of the restraint module 18. The distance between the transducer 44 and the occupant 14 is indicative of the distance between the restraint module 18 and the occupant (i.e., the distance offset between the transducer and the restraint module is known). The distance between the transducer 44 and the occupant 14 is used by the controller 30 to make one or more determinations regarding the deployment and/or adjustment of the restraint module 18.

Figure 2:
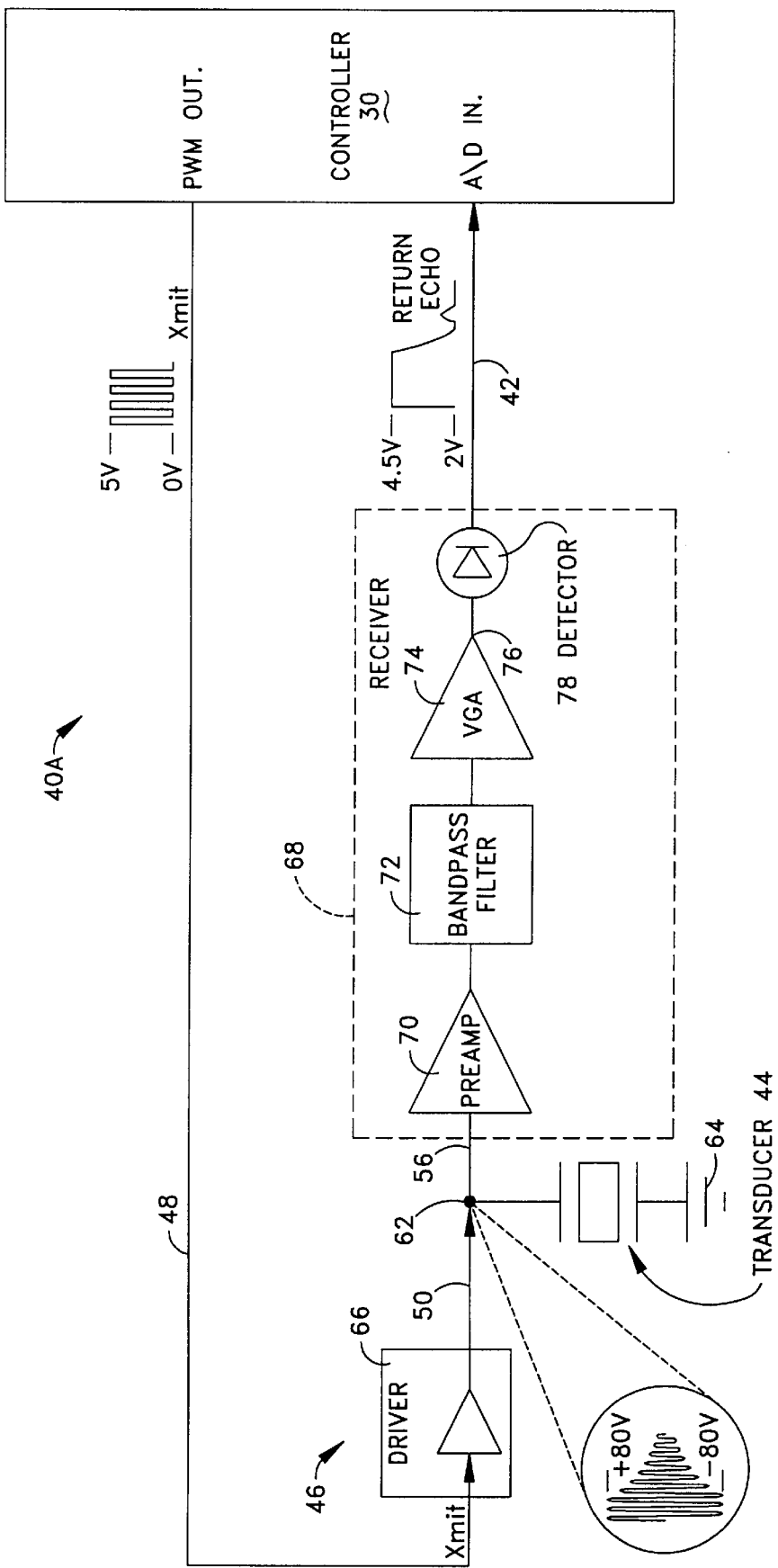
FIG. 2 is a schematic circuit diagram of a first embodiment of the present invention.

A first embodiment of the ultrasonic sensor system 40 is shown in FIG. 2 and is designated 40A. The transducer 44 is connected between a node 62 and electrical ground 64. A driver portion 66 of the driver/receiver circuitry 46 is represented schematically as including an amplifier that is connected to receive the signal 48 from the controller 30. The driver portion 66 provides an amplified signal to the node 62.

A receiver portion 68 of the driver/receiver circuitry 46 includes a preamplifier 70, a bandpass filter 72, and a variable gain amplifier (VGA) 74, which are serially arranged. The output 76 of the variable gain amplifier 74 is supplied as an input to a detector 78. The detector 78 outputs a dc voltage signal having an amplitude related to the amplitude of the oscillating signal from the variable gain amplifier. In one embodiment, the detector 78 becomes "saturated" by an input amplitude greater than a predetermined value. When the detector is saturated, the output of the detector is a predetermined maximum. In the illustrated example, the "saturation" output value is 4.5 volts.

Because the driver portion 66 and the receiver portion 68 of the driver/receiver circuitry 46 are connected to the node 62, the receiver portion "sees" not only electrical signals generated by vibration of the transducer 44, but also "sees" the excitation signal 50. The signal 50 has sufficient strength to cause saturation at the detector 78 output.

An initial portion of the ringdown of the transducer 44 also results in detector saturation. Also, depending upon the parameters of the system and the proximity, etc. of an echo-causing object (e.g., the occupant 14), the echo signal 54 may result in detector saturation.

The output of the detector 78 is the signal 42 to the controller 30. In one example, the time measurement between the output of signal 48 and the receipt of signal 42 is accomplished by measuring the time period between the leading edge of the signal 48 and the leading edge of the signal 42 that results from an echo.

Figure 3:
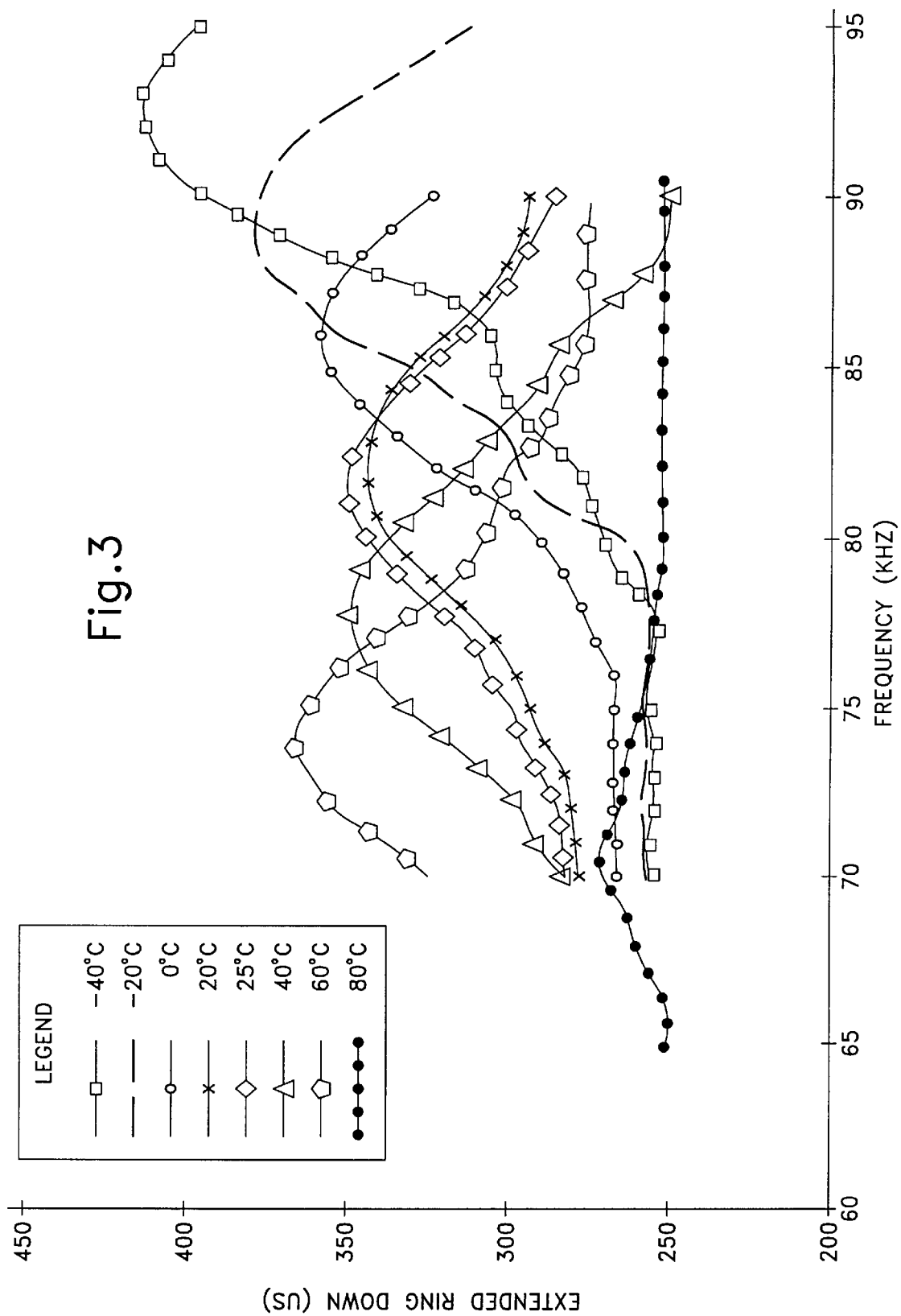
FIG. 3 is a plot showing transducer ringdown verses frequency for various temperatures.

As mentioned above, maximum vibration within the transducer 44, and thus maximum strength of the ultrasonic signal 52, is achieved at the natural frequency of the transducer. However, the natural frequency of the transducer 44 is subject to variation due to variation in temperature. An example of the variation in natural frequency of the transducer 44 is show by FIG. 3. In FIG. 3, each plot is of ringdown duration for a series of excitation frequencies at a specific temperature. The natural frequency, as noted above, is the frequency associated with the greatest ringdown duration. Thus, for each temperature, the natural frequency of the transducer 44 is the frequency associated with the apex of the respective plotted curve.

The ultrasound sensor system 40, in accordance with the present invention, automatically adjusts the frequency of the excitation signal 50 to match the current natural resonant frequency of the transducer 44, in order to optimize the performance of the sensor system 40. Specifically, the frequency of the excitation signal 50 is adjusted to the natural frequency by utilizing the ringdown characteristic of the transducer 44. In order to determine the natural resonant frequency of the transducer 44, the ringdown of the transducer is monitored during a test/adjustment procedure in which a series of test excitation signals 50, each having a different frequency, are applied to the transducer. In order to perform the test/adjustment procedure, the ultrasonic sensor system 40 includes suitable structure for providing the series of test excitation signals and for monitoring one or more aspects of the ringdown that indicate maximum ringdown duration. An example of such test/adjustment structure 84, in accordance with the present invention, is shown in FIG. 4.

Figure 4:
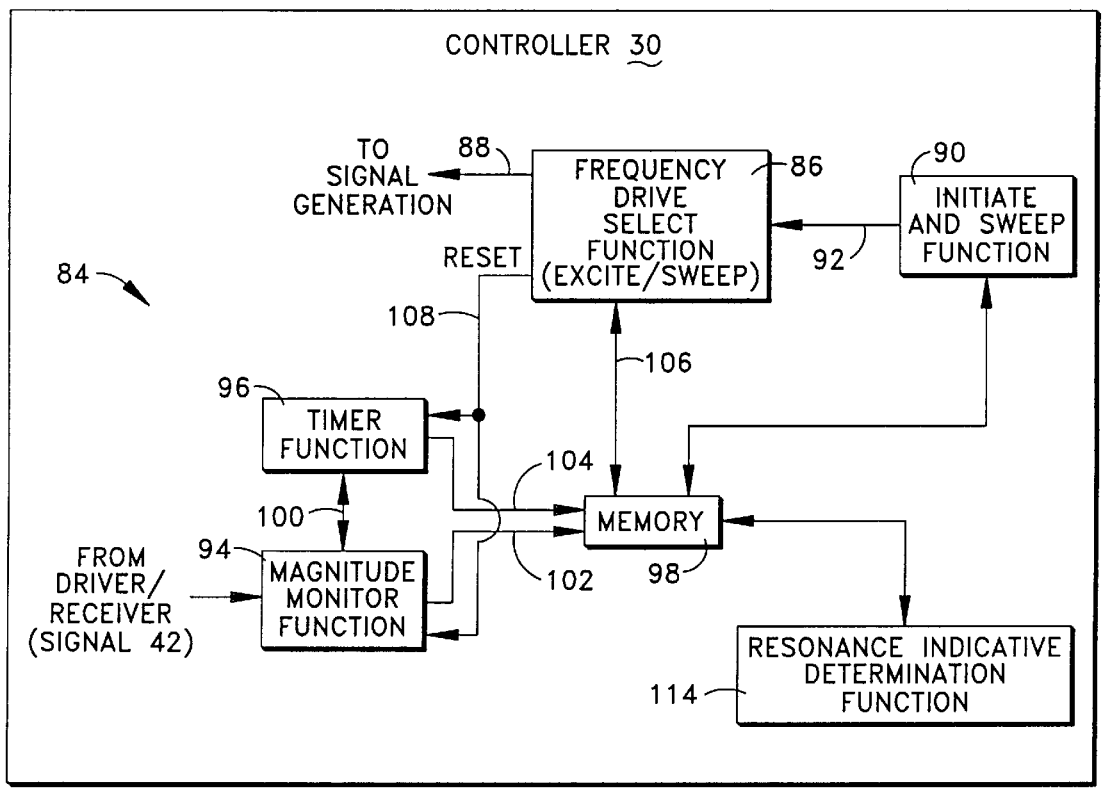
FIG. 4 is a functional block diagram showing details of the controller of FIG. 2.

In the example shown in FIG. 4, function blocks illustrate the components of the test/adjustment structure 84. It will be appreciated by a person of ordinary skill in the art that the function provided by each function block may be accomplished by suitable programming steps preformed by the controller 30. A person of ordinary skill in the art will also appreciate that each function of the illustrated function blocks may be accomplished by discrete elements.

The test/adjustment structure 84 includes a frequency drive select function 86, which provides a frequency value at which the transducer 44 is to be excited. A signal 88 from the frequency drive select function 86 outputs the drive signal at a frequency value that is to be currently used to excite the transducer 44. The frequency drive select function 86 has a first state when the sensor system 40 is performing occupant detection/distance measurement and a second state when the sensor system is performing a test/adjustment procedure. In the first state, the frequency drive select function 86 provides the signal 88 to convey a frequency value that is considered to be the current natural frequency of the transducer 44. The transducer 44 is excited at that current frequency value, via the excitation signal 50, for all occupant-sense cycles.

In the second state, the frequency drive select function 86 provides the signal 88 to convey a frequency value that changes (i.e., the frequency value is "stair-stepped" or "swept") from a start frequency to an end frequency. Thus, the excitation of the transducer 44 is varied through a plurality of, sequentially applied, frequencies (i.e., a range of test frequencies). An initiate and sweep function 90 provides a signal 92 to the frequency drive select function 86 that causes the frequency drive select function to change from the first state (occupant sense mode) to the second state (test/adjustment mode).

A magnitude monitor function 94 is connected to monitor the magnitude of the signal 42 (i.e., the output of the detector 78 in the embodiment shown in FIG. 2). The magnitude monitor function 94 (FIG. 4) is connected to communicate, via signal 100 and 102, with a timer function 96 and a memory 98, respectively. One communication signal 100 provided to the timer function 96 from the magnitude monitor function 94 is a trigger signal, which indicates to the timer function that the magnitude monitor function has detected a predetermined magnitude in the signal 42. A communication signal 102 connected to the memory 98 from the magnitude monitor function 94 indicates the magnitude of the detected magnitude event. The timer function 96 also communicates, via a signal 104, with the memory 98 to provide timing values associated with the magnitude events detected by the magnitude monitor function 94. The frequency drive select function 86 also communicates, via signals 106, with the memory 98 such that the memory is provided with the current frequency value being utilized for transducer 44 (FIG. 2) excitation.

During the test/adjustment procedure, the magnitude monitor function 94, the timer function 96, and the frequency drive select function 86 provide their respective informational signals 102–106 to the memory 98 as each frequency in the range of test frequencies is used to excite the transducer 44. Prior to each frequency adjustment during the test/adjustment procedure, the frequency drive select function 86 provides a suitable reset signal 108 for the timer function 96 and the magnitude monitor function 94.

The memory 98 is connected to supply all of the information gathered during the frequency test portion (i.e., the "sweep" of frequencies) of the test/adjustment procedure to a resonance indicative determination function 114. The determination function 114 makes comparisons among the information gathered during the frequency sweep and makes a determination as to which frequency corresponds with the natural resonance of the transducer 44.

The range of frequencies which is "swept" during the test/adjustment procedure can be preset and stored in memory 98. The range would extent to include the frequencies that are expected to include the natural resonant frequency of the transducer 44. Also, the range of frequencies can itself be adjustable as the natural resonant frequency changes. Specifically, the range would change so as to have the last determined natural resonant frequency in the center of the sweep range. Also, those skilled in the art will appreciate that the frequency range is divided into a predetermined number of discrete frequency values. The number of such values over the range is related to the desired frequency resolution and is a matter of design choice.

Focusing now on the methodology of resonant frequency determination, any one of a number of ringdown characteristics may be monitored by the magnitude monitor function 94 and timer function 96, and compared by the determination function 114 to determine the natural resonance frequency of the transducer 44. In accordance with the present invention, a first embodiment of the control process is provided for the embodiment of the receiver 68 that has a detector 78 with an output that becomes "saturated". For this embodiment, the magnitude monitor function 94 provides a first trigger, via the signal 100, to the timer function 96 at the beginning of a detector output saturation for each frequency tested (i.e., for each frequency provided by the frequency drive select function 86 during the test/adjustment procedure).

The timer function 96 monitors the time duration until the saturation of the detector 78 terminates. The saturation termination occurs when the value of the detector output signal 42 becomes less than the saturation value, and, in response, the magnitude monitor function provides a second trigger to the timer function 96. The duration of the detector saturation for each frequency value is stored in memory 98. The determination function 114 determines a frequency value that resulted in the greatest time period of the detector saturation stored in memory 98.

The frequency associated with the greatest detector saturation time period is the current natural frequency of the transducer 44. The determination function 114 stores in the memory 98 the determined current natural frequency value for use during the occupant sense procedure of the sensor system 40. Thus, during the next, subsequent occupant sense procedure, the frequency drive select function 86 retrieves from the memory 98 the current natural frequency value and uses the retrieved frequency value for transducer excitation.

In accordance with another embodiment of the control process of the present invention, the natural resonant frequency of the transducer 44 is determined by monitoring the time value required for the output of the detector 78 to fall to a predetermined value after termination of the excitation signal. This embodiment of the control process is useful for the embodiment of the receiver 68 which has a detector 78 that does not "saturate". The magnitude monitor function 94 provides a first trigger signal to the timer function 96 at the beginning of the detector saturation. The magnitude monitor function 94 provides a second trigger signal to the timer function 96 when the signal falls to a predetermined level (i.e., below the saturation value). The time period for each frequency utilized as a test excitation frequency is stored within the memory 98. The determination function 114 determines which time period is the largest. The associated frequency is stored in the memory 98. Similar to the first method, the stored frequency is used by the frequency drive select function 86 for the system occupant sensing function.

In accordance with yet another embodiment of the control process, the value of the signal 42 output by the detector 78 is monitored at a predetermined time after initial saturation. This process embodiment is useful for the embodiment of the receiver 68 which has a detector 78 that does not "saturate". The magnitude monitor function 94 provides a trigger signal to the timer function at the beginning of the detector output saturation. The timer function counts down a predetermined time duration. At the end of the predetermined time duration, the timer function 96 provides a trigger signal to the magnitude monitor function 94. In response to the trigger signal from the timer function 96, the magnitude monitor function 94 provides the current value of the detector output to the memory 98. In this embodiment, the determination function 114 determines the greatest value of the detector output stored in memory 98. The frequency associated with the greatest detector output is stored in the memory 98 as the current natural resonant frequency of the transducer 44. Similar to the above noted alternatives, the frequency drive select function 86 utilizes the current natural resonance frequency value for the occupant sensing function.

Figure 5:
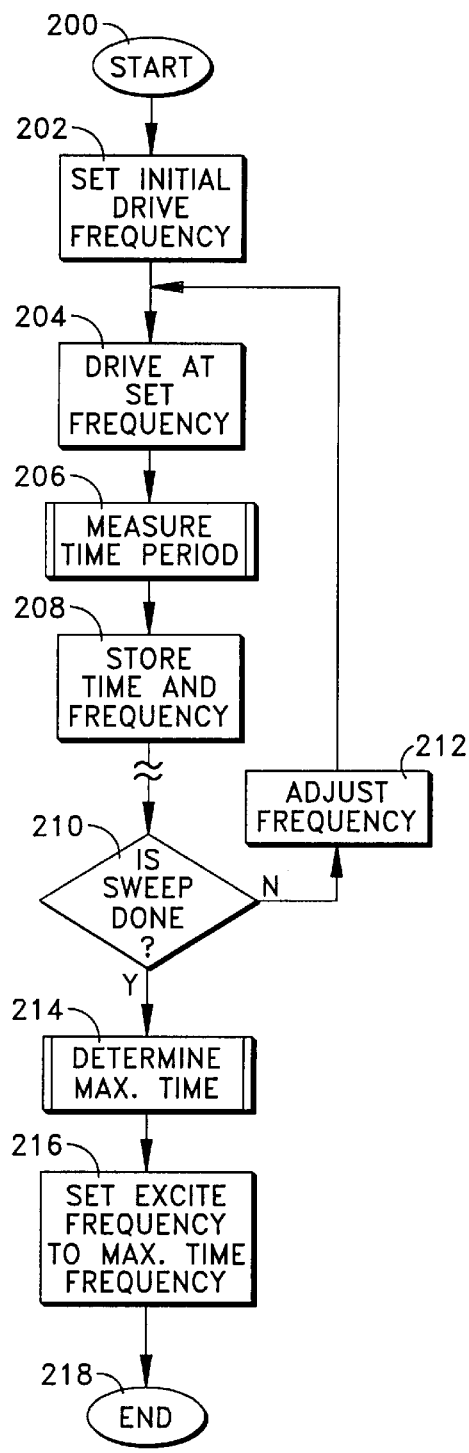
FIG. 5 is a flow chart for a process in accordance with the present invention and performed within the controller of FIG. 2.

FIG. 5 is a flow chart of the process performed within the controller 30 to accomplish either of the first two controller methods discussed above (i.e., (1) the alternative which measures time until detector output saturation ends, and (2) the alternative which measures time until the detector output is at a predetermined value). The process is initiated at step 200 and proceeds to step 202. At step 202, an initial frequency value of the test frequency range is provided by the frequency drive select function 86. At step 204, the frequency drive select function 86 outputs the signal 88 to cause the excitation signal 50 to be at the initial frequency provided.

At step 206, the pertinent ringdown time period to a predetermined value is measured. Step 206 represents a routine. In the embodiment which measures the time period of the detector output saturation, the routine of step 206 includes the magnitude monitor function 94 providing the first trigger signal to the timer function 96 to start the measurement of the time period and the magnitude monitor function providing second trigger signal to terminate the measurement of the time period. In the embodiment which measures the time from the detector output saturation initiation to a predetermined value, the routine of step 206 includes the magnitude monitor function 94 providing the first trigger signal at the beginning of saturation and the magnitude monitor function 94 providing the second trigger signal when the predetermined value is reached.

Once a time period is determined for a particular test frequency, the time period and its associated frequency are stored in the memory 98 at step 208. Other subsequent housekeeping steps of the type well known in the art may be in the control process after step 208 such as clearing registers, etc. Thus, a broken line is shown in the flowchart after step 208.

At step 210, it is determined whether the "sweep" is done. In other words, have all of the frequencies in the test frequency range been applied to the transducer 44. If the determination at step 210 is negative, the process proceeds to step to 212, wherein the frequency is adjusted (e.g., provide a new frequency value to the frequency drive select function 86). Once the frequency is adjusted at step 212, the process loops back to step 204 wherein the excitation signal 50 at the new frequency is applied to excite the transducer 44.

If the determination at step 210 is affirmative (i.e., all of the test frequencies of the frequency range have been applied to the transducer 44), the process proceeds to step 214. Step 214 is a routine in which the time periods are compared by the determination function 114 and the largest time period is determined. At step 216, the frequency associated with the largest time period is stored in the memory 98 as the new or current natural resonant frequency value of transducer 44. At step 218, the process ends and the controller 30 resumes an occupant sensing process using the new natural resonant frequency.

The process shown in FIG. 5 can occur at various time. For example, the process can be initiated upon each initial "key-on" of the vehicle. Alternatively, the process can be periodically performed during vehicle use. Although it is possible to test during non-use of the vehicle, such calibration would seem unnecessary.

Figure 6:
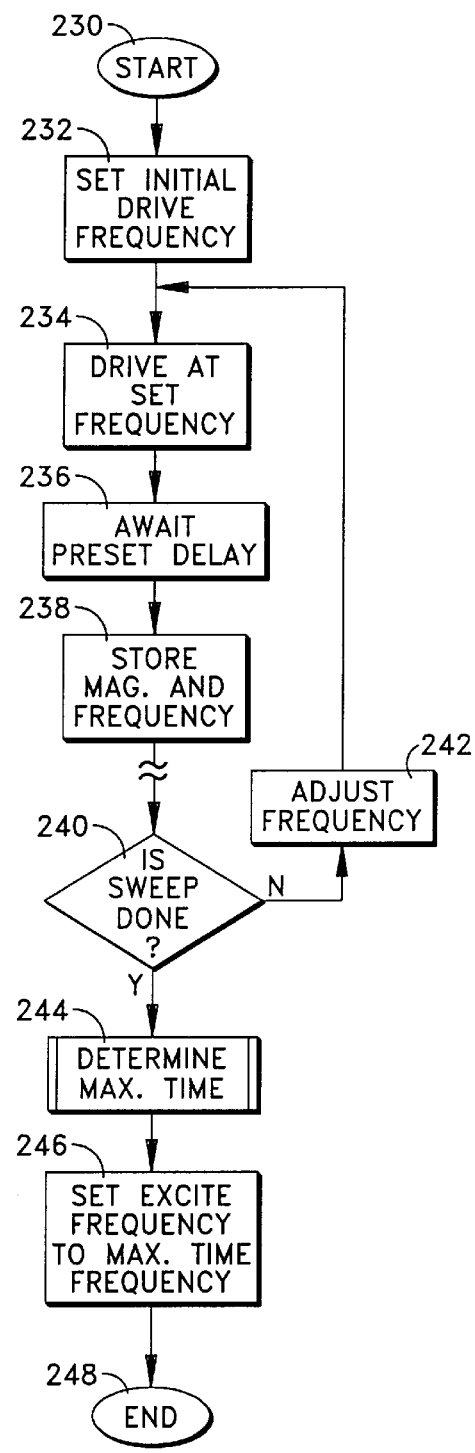
FIG. 6 is a flow chart for an alternative process in accordance with the present invention and performed within the controller of FIG. 2.

FIG. 6 is a flow chart of the process performed by the controller 30 in accordance with the third embodiment of the present invention (i.e., the embodiment that measures the detector output value at a predetermined time). The process is initiated at step 230 and proceeds to step 232. At step 232, an initial frequency of the test frequency range is provided to the frequency drive select function 86. At step 234, the frequency drive select function 86 outputs the signal 88 to cause the excitation signal 50 to be at the provided frequency.

At step 236, the timer function 96 times-out the predetermined time period. At the end of the time period, the magnitude monitor function 94 monitors or measures the value of the detector output. At step 238, the value measured by the magnitude monitor function 94 and its associated frequency value are stored to memory. Other housekeeping steps of the type known in the art may occur after step 238 such as clearing registers, etc. Thus, a broken line is shown in the flowchart.

At step 240, it is determined whether the "sweep" is done. In other words, have all of the discrete frequency values in the test frequency range been applied to the transducer 44. If the determination at step 240 is negative, the process proceeds to step to 242, wherein the frequency value is adjusted (e.g., provide a new frequency value to the frequency drive select function 86). Once the frequency value is adjusted at step 242, the process loops back to step 234 wherein the excitation signal 50 at the new frequency is applied to excite the transducer 44.

If the determination at step 240 is affirmative (i.e., all of the test frequencies in the test frequency range have been applied to the transducer 44), the process proceeds to step 244. Step 244 is a routine in which the magnitudes monitored by the magnitude monitor function 94 and stored in memory 98 are compared by the determination function 114 and the largest magnitude value is determined. At step 246, the frequency value associated with the largest magnitude value is stored in the memory 98 as the new natural resonant frequency. At step 248, the process ends and the controller 30 resumes an occupant sensing process using the new natural resonant frequency. As was discussed with regard to the FIG. 5 embodiment, the control process depicted in FIG. 5 can occur at vehicle key-on or periodically during vehicle use.

Moreover, it should be noted that the test/adjustment process of the present invention may be performed in a continuous block of time or may be performed interspersed with the occupant sensing function of the controller. Specifically, a test/adjustment process that is performed within a continuous block of time occurs when the controller ceases occupant sensing for the entire duration of the test and adjustment process. The occupant sensing process resumes once the test/adjustment process is completed and provides a new natural resonant frequency.

When the test/adjustment process is interspersed with occupant sensing, the process tests a portion of the range of frequencies. The test/adjustment process is then interrupted/suspended to perform an occupant sense process utilizing the existing natural resonance frequency value. Once the occupant sense process is complete, the test/adjustment process resumes. Alternatively, the controller can toggle between the test/adjustment process and occupant sense processes until the test/adjustment process is complete and derives a new natural resonant frequency is determined (i.e., all of the frequencies within the range are tested). Subsequent occupant sense processes utilize the updated natural resonant frequency value for the transducer. The value of the natural frequency will remain unchanged until the control process is run again, e.g., at next key-on or at a predetermined interval past the last test.

Figure 7:
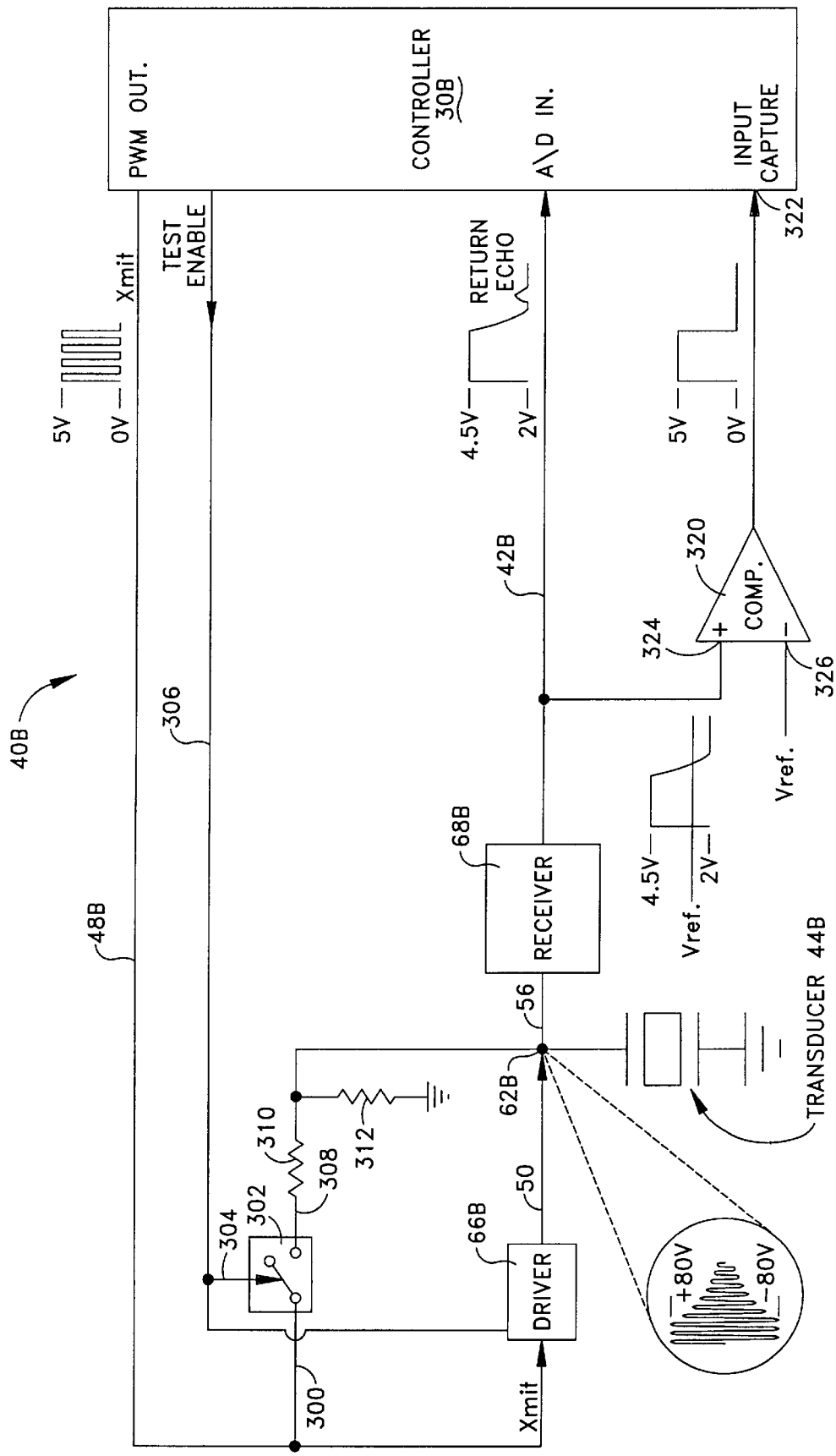
FIG. 7 is a second embodiment in accordance with the present invention.

A second embodiment of the ultrasonic sensor system, in accordance with the present invention, is shown in FIG. 7 and is designated 40B. The ultrasonic sensor system 40B includes a transducer 44B, a driver portion 66B, and a receiver portion 68B similar to the transducer, driver portion, and receiver portion of the ultrasonic sensor system 40A shown in FIG. 2. The controller of the embodiment shown in FIG. 7 differs from the controller of the embodiment of FIG. 2, in that the controller of FIG. 7 has additional functions and is thus designated 30B. Also, the sensor system 40B (FIG. 7) has additional components, as compared to sensor system 40A (FIG. 2). Specifically, the controller 30B (FIG. 7) is capable of providing the signal 48B at a first, higher power level for exciting the transducer 44B to sense the occupant characteristic. The controller 30B is also capable of providing the signal 48B at a lower power level for use during a test/adjustment procedure.

In addition to the signal 48B being provided to the driver portion 66B, the signal 48B is provided as a first input 300 to a switching device 302. In one example, the switching device 302 includes an AND gate. A control input 304 to the switching device 302 is provided by the controller 30B in the form of an enable signal 306. The enable signal 306 is also provided to the driver portion 66B to enable or disable the driver portion.

The output 308 of the switching device 302 is connected, via a resistor 310, to the node 62B. The node 62B is also connected, via a second resistor 312, to electrical ground.

During a test/adjustment process, the signal 48B is provided in its low power form, and a HIGH enable signal 306 is provided to the control input 304 of the switching device 302 and is also provided to the driver portion 66B to disable driver 66B. The low power signal 48B is output at 308, and is applied to the node 62B via resistor 310. The low power signal 48B causes the transducer 44B to vibrate.

The vibration of the transducer 44B does not provide an ultrasonic signal 52 of sufficient strength to echo from a remote object, such as the occupant 14. Thus return echoes do not impinge upon the transducer 44B which could effect monitoring of the ringdown of the transducer. Once the low power signal 48B ceases, the transducer 44B rings down and the ringdown of the transducer may be monitored as described above.

As an additional modification set forth in the embodiment of the sensor system 40B shown in FIG. 7, a comparator 320 is connected to the output of the receiver portion 68B and is connected to an input capture terminal 322 of the controller 30B. Specifically, a first input terminal 324 of the comparator 320 is connected to the signal 42B output of the receiver portion 68B (e.g., the detector output). A second input terminal 326 of the comparator 320 is connected to a reference voltage $V_{REF}$. The input capture terminal 322 of the controller 30B is connected to a high performance digital microprocessor within the controller. The microprocessor has enhanced resolution to discriminate the optimal ringdown time.

During a test/adjustment procedure, the comparator 320 provides digital signal to the input capture terminal 322. Specifically, when the analog value of the signal 42B exceeds the reference voltage value $V_{REF}$, the output of the comparator 320 is a digital HIGH. When the analog value of the signal 42B falls below the reference value $V_{REF}$, the output of the comparator 320 is a digital LOW. The microprocessor within the controller monitors the time durations. Each time duration is proportional to ringdown time. Thus, the natural resonant frequency of the transducer 44B is determined by determining which frequency is associated with the longest time duration.

From the above description of the invention, those skilled in the art will perceive improvements, changes and modifications. For example, the invention may be utilized in a restraint system for a vehicle occupant. Also, the invention may be used for other, non-vehicle, applications. Such improvements, changes and modifications within the skill of the art are intended to be covered by the appended claims.

Having described the invention, the following is claimed:

1. An ultrasonic sensor system comprising:

transducer means for emitting an ultrasonic signal in response to an electrical excitation signal and for outputting an electrical response signal in response to receipt of a reflected ultrasonic signal from an object, said transducer means rings-down upon termination of the electrical excitation signal, and said transducer means having a natural resonant frequency which is subject to change;

excitation signal provision means for providing the electrical excitation signal to said transducer means;

processing means for processing the electrical response signal resulting from excitation of said transducer means by the electrical excitation signal at a predetermined frequency for determining distance between said transducer means and the object;

frequency variation means for varying the frequency of the electrical excitation signal over a range of frequencies;

monitor means for monitoring the ringdown of said transducer means during the variation of the frequency of the electrical excitation signal over the range of frequencies and for determining a current natural resonant frequency of said transducer means; and adjustment means for changing the predetermined frequency to the determined natural resonant frequency.

2. An ultrasonic sensor system comprising:

transducer means for emitting an ultrasonic signal in response to an electrical excitation signal and for outputting an electrical response signal in response to receipt of a reflected ultrasonic signal from an object, said transducer means rings-down upon termination of the electrical excitation signal, and said transducer means having a natural resonant frequency which is subject to change;

excitation signal provision means for providing the electrical excitation signal to said transducer means;

processing means for processing the electrical response signal resulting from excitation of said transducer means by the electrical excitation signal at a predetermined frequency for determining distance between said transducer means and the object;

frequency variation means for varying the frequency of the electrical excitation signal over a range of frequencies;

monitor means for monitoring the ringdown of said transducer means during the variation of the frequency of the electrical excitation signal over the range of frequencies and for determining a current natural resonant frequency of said transducer means; and adjustment means for changing the predetermined frequency to the determined natural resonant frequency;

said monitor means including means for monitoring a ringdown characteristic indicative of the duration of the ringdown of said transducer means.

3. A system as set forth in claim 2, wherein said means for monitoring a ringdown characteristic includes means for monitoring the duration that the electrical response exceeds a predetermined threshold.

4. A system as set forth in claim 2, wherein said processing means includes receiver circuitry with a detector that outputs a signal having a pulse duration and a magnitude related to the electrical response signal, said means for monitoring a ringdown characteristic monitors the signal output by said detector.

5. A system as set forth in claim 4, wherein said means for monitoring a ringdown characteristic monitors the duration that the signal output by said detector exceeds a predetermined threshold.

6. A system as set forth in claim 5, wherein the signal output by said detector has a saturation value, said means for monitoring a ringdown characteristic monitors the duration that the signal output by said detector is at the saturation value.

7. A system as set forth in claim 2, wherein said means for monitoring a ringdown characteristic includes means for monitoring the magnitude of the electrical response signal at a predetermined time.

8. A system as set forth in claim 7, wherein said processing means includes receiver circuitry with a detector that outputs a signal having a duration and a magnitude related to the electrical response signal, the magnitude of the signal output by said detector has a value indicative of an amplitude of the electrical response signal at the predetermined time, said means for monitoring a ringdown characteristic monitors the value of the signal output by said detector at the predetermined time.

9. An ultrasonic sensor system comprising:

transducer means for emitting an ultrasonic signal in response to an electrical excitation signal and for outputting an electrical response signal in response to receipt of a reflected ultrasonic signal from an object, said transducer means rings-down upon termination of the electrical excitation signal, and said transducer means having a natural resonant frequency which is subject to change;

excitation signal provision means for providing the electrical excitation signal to said transducer means;

processing means for processing the electrical response signal resulting from excitation of said transducer means by the electrical excitation signal at a predetermined frequency for determining distance between said transducer means and the object;

frequency variation means for varying the frequency of the electrical excitation signal over a range of frequencies;

monitor means for monitoring the ringdown of said transducer means during the variation of the frequency of the electrical excitation signal over the range of frequencies and for determining a current natural resonant frequency of said transducer means; and adjustment means for changing the predetermined frequency to the determined natural resonant frequency;

said excitation signal provision means including means for providing a low power excitation signal to said transducer means, the low power excitation signal having sufficient strength to cause ringdown of said transducer means and having insufficient strength to cause a reflected ultrasonic signal, said monitor means monitors the ringdown of said transducer means caused by the low power excitation.

10. A system as set forth in claim 9, wherein said monitor means includes comparator means that outputs a digital HIGH signal during the time period that the ringdown of said transducer exceeds a predetermined strength, said monitor means also includes means for determining the duration of the digital HIGH signal.

11. A system as set forth in claim 1, wherein said processing means includes means for providing a signal to a vehicle occupant restraint system having a controllable restraint device that is controlled in response to the signal from said means for providing a signal.

12. A method of ultrasonic sensing with automatic excitation frequency adjustment, said method comprising:

providing an electrical excitation signal to a transducer means;

emitting an ultrasonic signal from the transducer means in response to the electrical excitation signal, the transducer means rings-down upon termination of the electrical excitation signal, and the transducer means having a natural resonant frequency which is subject to change;

outputting an electrical response signal in response to receipt of a reflected ultrasonic signal from an object;

processing the electrical response signal resulting from excitation of the transducer means by the electrical excitation signal at a predetermined frequency for determining distance between the transducer means and the object;

varying the frequency of the electrical excitation signal over a range of frequencies;

monitoring the ringdown of the transducer means during the variation of the frequency of the electrical excitation signal over the range of frequencies;

determining a current natural resonant frequency of the transducer means; and changing the predetermined frequency to the determined natural resonant frequency.

13. A method of ultrasonic sensing with automatic excitation frequency adjustment, said method comprising:

providing an electrical excitation signal to a transducer means;

emitting an ultrasonic signal from the transducer means in response to the electrical excitation signal, the transducer means rings-down upon termination of the electrical excitation signal, and the transducer means having a natural resonant frequency which is subject to change;

outputting an electrical response signal in response to receipt of a reflected ultrasonic signal from an object;

processing the electrical response signal resulting from excitation of the transducer means by the electrical excitation signal at a predetermined frequency for determining distance between the transducer means and the object;

varying the frequency of the electrical excitation signal over a range of frequencies;

monitoring the ringdown of the transducer means during the variation of the frequency of the electrical excitation signal over the range of frequencies;

determining a current natural resonant frequency of the transducer means; and changing the predetermined frequency to the determined natural resonant frequency;

said step of monitoring including monitoring a ringdown characteristic indicative of the duration of the ringdown of the transducer means.

14. A method as set forth in claim 13, wherein said step of monitoring a ringdown characteristic includes monitoring the duration that the electrical response signal exceeds a predetermined threshold.

15. A method as set forth in claim 13, wherein said step of processing includes applying the electrical response signal to receiver circuitry with a detector that outputs a signal having a pulse duration and a magnitude related to the electrical response signal, said step of monitoring a ringdown characteristic includes monitoring the signal output by the detector.

16. A method as set forth in claim 15, wherein said step of monitoring a ringdown characteristic includes monitoring the duration that the signal output by the detector exceeds a predetermined threshold.

17. A method as set forth in claim 16, wherein the signal output by the detector has a saturation value, said step of monitoring a ringdown characteristic includes monitoring the duration that the signal output by the detector is at the saturation value.

18. A method as set forth in claim 13, wherein said step of monitoring a ringdown characteristic includes monitoring the magnitude of the electrical response signal at a predetermined time.

19. A method as set forth in claim 18, wherein said step of processing includes providing the electrical response signal to receiver circuitry with a detector that outputs a signal having a duration and magnitude related to the electrical response signal, magnitude of the signal output by the detector has a value indicative of the electrical response signal at the predetermined time, said step of monitoring a ringdown characteristic includes monitoring the value of the signal output by the detector at the predetermined time.

20. A method of ultrasonic sensing with automatic excitation frequency adjustment, said method comprising:

providing an electrical excitation signal to a transducer means;

emitting an ultrasonic signal from the transducer means in response to the electrical excitation signal, the transducer means rings-down upon termination of the electrical excitation signal, and the transducer means having a natural resonant frequency which is subject to change;

outputting an electrical response signal in response to receipt of a reflected ultrasonic signal from an object;

processing the electrical response signal resulting from excitation of the transducer means by the electrical excitation signal at a predetermined frequency for determining distance between the transducer means and the object;

varying the frequency of the electrical excitation signal over a range of frequencies;

monitoring the ringdown of the transducer means during the variation of the frequency of the electrical excitation signal over the range of frequencies;

determining a current natural resonant frequency of the transducer means; and changing the predetermined frequency to the determined natural resonant frequency;

said step of providing an excitation signal includes providing a low power excitation signal to the transducer means, the low power excitation signal has sufficient strength to cause ringdown of the transducer means and has insufficient strength to cause a reflected ultrasonic signal, said step of monitoring includes monitoring the ringdown of the transducer means caused by the low power excitation.

21. A method as set forth in claim 20, wherein said step of monitoring includes providing a signal to a comparator means that outputs a digital HIGH signal during the time period that the ringdown of the transducer exceeds a predetermined strength, said step of monitoring includes determining the duration of the digital HIGH signal.

22. A method as set forth in claim 12, includes providing a signal, indicative of the distance between the transducer means and the object, to a vehicle occupant restraint system having a controllable restraint device that is controlled in response to the signal.

* * * * *